United States Patent [19]

Kosaka et al.

[11] Patent Number: 4,658,361
[45] Date of Patent: Apr. 14, 1987

[54] METHOD AND APPARATUS FOR DETERMINING SATELLITE ATTITUDE BY USING STAR SENSOR

[75] Inventors: Michitaka Kosaka, Sagamihara; Satoshi Mohri, Kawasaki; Katsumi Kawano, Tokyo; Toshiro Sasaki; Shoji Miyamoto, both of Kawasaki; Takashi Nakajima, Tokyo, all of Japan

[73] Assignee: Hitachi, Ltd., Tokyo, Japan

[21] Appl. No.: 632,847

[22] Filed: Jul. 20, 1984

[30] Foreign Application Priority Data

Jul. 25, 1983 [JP] Japan .................. 58-134320

[51] Int. Cl.⁴ .................. G06F 15/50; B64G 1/10
[52] U.S. Cl. .................. 364/434; 364/459; 342/352
[58] Field of Search .................. 364/455, 434, 459; 356/141, 144, 146, 15.2; 244/164, 171, 176; 318/582; 343/352, 355, 356, 357, 358

[56] References Cited

U.S. PATENT DOCUMENTS

| | | | |
|---|---|---|---|
| 3,251,261 | 5/1966 | Lillestrand | 356/141 |
| 3,263,088 | 7/1966 | Goldfischer | 356/141 |
| 3,488,504 | 1/1970 | Lowen et al. | 356/141 |
| 3,912,398 | 10/1975 | Zenk | 356/152 |
| 3,992,106 | 11/1976 | Auerbach | 356/141 |
| 4,388,646 | 6/1983 | Strother | 364/517 |

OTHER PUBLICATIONS

Lillestrand et al, "Horizon-based Satellite Navigation Systems", Sep. '63, pp. 247-270, *IEEE Transactions on Aerospace and Navigational Electronics*, vol. ANE-10.
Still, "Aerospace Computers do More and More", Feb. '66, pp. 61-65, *Control Engineering*.
"Digital Attitude Reference System (Dars)", Cambell et al, vol. 20, No. 1, Spring 1973, pp. 49-67, *Journal of the Institute of Nav.*.

*Primary Examiner*—Errol A. Krass
*Assistant Examiner*—Thomas G. Black
*Attorney, Agent, or Firm*—Antonelli, Terry & Wands

[57] ABSTRACT

An apparatus for determining attitude of a satellite by using a star sensor includes a ground terminal equipped with a data processing unit and star catalogue, a star sensor, an estimating the unit for estimating attitude of the satellite and a decision unit for deciding the attitude determination mode I or II in dependence on attitude stability of the satellite. In the mode I, angles representative of the satellite attitude are estimated by the estimating unit on the basis of a star sub-catalogue prepared by utilizing a priori information. In the mode II, the attitude angles are estimated by the data processing unit through data transaction with the ground terminal without resorting to the use of the priori information.

9 Claims, 10 Drawing Figures

| | | -180 ~175 | | | 170 ~175 | 175 ~180 |
|---|---|---|---|---|---|---|
| | | RIGHT ACSENSION | | | | |
| DECLINATION | 90 ~85 | | | | | |
| | | | | ⋮ | | |
| | | | | | | |
| | -85 ~-90 | | | | | |

50  50

| STAR Nos. | RIGHT ACSENSION | DECLI-NATION | BRIGHT-NESS |
|---|---|---|---|
| 1 | --- | --- | |
| | | | |

| STAR Nos. | x | y | h |
|---|---|---|---|
| 1 | | | |
| ⋮ | ⋮ | ⋮ | · |
| | | | |

FIG. 7

| STAR Nos. | $x$ | $y$ | $h$ |
|---|---|---|---|
| 1 | | | |
| | ⋮ | | |
| | | | |

FIG. 8

| $h_1$ | $X_1$ | $X_2$ | $X_3$ | -- | -- | $X_n$ | RIGHT ACSENSION | DECLINATION |
|---|---|---|---|---|---|---|---|---|
| *** | **** | | | | | | $\theta_1$ | $\varphi_1$ |
| *** | | | | | | | $\theta_2$ | $\varphi_2$ |
| ↓ | ↓ | ↓ | | | | | | |
| *** | **** | | | | | | $\theta_n$ | $\varphi_n$ |

FIG. 9

| | | $h_\ell$ | |
|---|---|---|---|
| | | | |
| $d_k$ | | $C_{k,\ell}^i$ | |
| | | | |

METHOD AND APPARATUS FOR DETERMINING SATELLITE ATTITUDE BY USING STAR SENSOR

BACKGROUND OF THE INVENTION

1. Field of the Invention

The present invention relates in general to a method and apparatus for determining attitude of an artificial satellite (hereinafter referred to simply as a satellite). In particular, the invention concerns such method and apparatus in which a star sensor is employed.

2. Description of the Prior Art

In a hitherto known satellite attitude determining system in which a star sensor is employed, the attitude of a satellite is measured with a relatively rough accuracy on the basis of information provided by attitude measuring sensors, such as gyros, earth sensors or the like, and star identification is made between the stars observed by the star sensor and those which are located in a predetermined region of the whole sky by making use of the attitude angle data obtained with rough accuracy. This is because there are as many as 6000 stars having brightness greater than the sixth stellar magnitude in the whole sky and great time consumption is involved if the star identification is made for each of these stars, respectively, putting aside the fact that a memory of a great capacity which is not suited to be loaded on the satellite is required. Such being the circumstance, the use of the star sensor has been limited to such application in which the satellite attitude is to be measured the using a star sensor in combination with another sensor with a high accuracy on the condition that the attitude of the satellite is stable.

SUMMARY OF THE INVENTION

An object of the present invention is to provide a method and apparatus for determining the attitude of a satellite by using a star sensor even in the case where the attitude of satellite is not in a stabilized state.

According to an aspect of the present invention, the procedure for determining the attitude of a satellite is divided into two modes of processings, i.e. the mode I in which the satellite is in a stable attitude so that the currently available data can be utilized to prepare a star subcatalogue for determining the attitude of the satellite, and the processing of the mode II in which the satellite attitude is unstable so that the currently available attitude data can not be used, wherein a star in concern is searched from a whole star catalogue. In the processing mode I, angles representative of the attitude of the satellite (also referred to as the attitude angles) are estimated on the basis of data contained in the sub-catalogue prepared on the basis of attitude information estimated by using another attitude sensor with the aid of a computer loaded on the satellite. In the processing of the mode II, the satellite attitude is determined through data transaction with the ground terminal without using the estimated attitude information. In this way, the data obtained through the star sensor can always be used to thereby assure the determination of satellite attitude with an improved accuracy.

BRIEF DESCRIPTION OF THE DRAWINGS

FIG. 7 shows a table structure containing data of position and brightness of observed stars.

FIG. 8 shows a composition of a star catalogue used in the processing of mode II.

FIG. 9 is a view showing a table listing penalties applied to vectors $X_i$.

DESCRIPTION OF THE PREFERRED EMBODIMENTS

Figure 1:
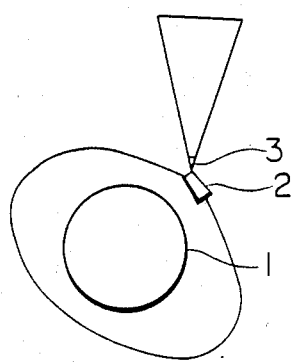
FIG. 1 is a schematic views showing a satellite equipped with a star sensor and orbiting around the earth.
Figure 2:
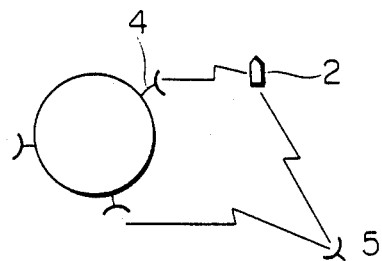
FIG. 2 is a schematic view for illustrating communication between the satellite and a ground terminal.

FIG. 1 shows an artificial satellite which is orbiting around the earth 1 and provided with a star sensor 3. For carrying out the invention, it is assumed that the satellite 2 can always communicate with a given ground terminal 4, as is illustrated in FIG. 2. For realizing such communication, it is conceivable to make use of a data relay satellite 5.

Figure 3:
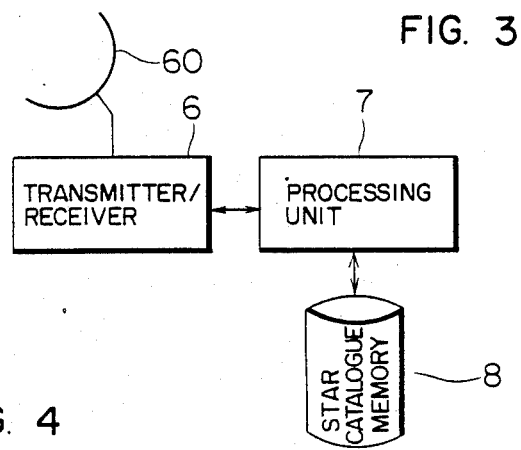
FIG. 3 shows an arrangement of a ground terminal system.
Figure 4:
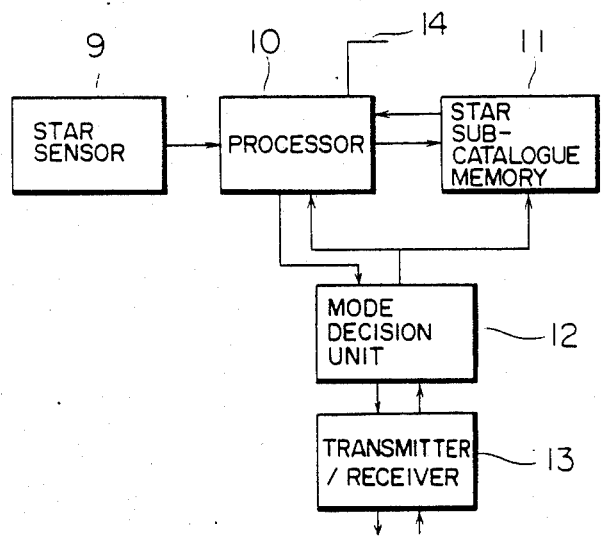
FIG. 4 is a block diagram showing a general arrangement of a satellite attitude determination system loaded on the satellite.

FIG. 3 shows a general arrangement of a ground terminal system which includes an antenna 60, a transmitter/receiver unit 6 for communicating with the satellite, a processing unit 7 and a star catalogue memory 8. FIG. 4 shows an arrangement of a satellite attitude determination system loaded on the satellite. This system is composed of a star sensor 9, a processor 10 for determining attitude of the satellite, a star sub-catalogue memory unit 11, mode decision unit 12, and a transmitter/receiver unit 13. The processors 10 and the mode decision unit 12 may be realized as a single unit.

In the following, the contents of the processings of modes I and II will be elucidated.

In the processing of mode I, attitude angle data $\theta(\theta_r, \theta_p, \theta_y)$ being currently estimated is utilized for identifying observed stars, where $\theta_r$ represents a roll angle, $\theta_p$ represents a pitch angle and $\theta_y$ represents a yaw angle. Accordingly, the estimating data $(\theta_r, \theta_p, \theta_y)$ and information indicating the mode I condition are transmitted to the ground terminal. In the ground terminal, the view-field direction vector of the star sensor is arithmetically determined on a reference coordinate system based on the coordinate system with reference to which the star sensor is mounted. More specifically, by using the view-field direction vector $\vec{U}$ on the coordinate system mounting the star sensor, which can be calculated on the basis of the position of stars projected on the star sensor plate, the direction vector $\vec{S}$ of that star on the inertia coordinate system can be determined in accordance with the following expression:

$$\vec{S} = \begin{pmatrix} x \\ y \\ z \end{pmatrix} = T_\theta{}^2 \cdot T_\theta{}^1 \cdot \vec{U}$$

where $T_\theta{}^1$ represents a coordinate transformation matrix from the star sensor coordinate system to the satellite body coordinate system and $T_\theta{}^2$ represents a coordinate transformation matrix from the satellite body coordinate system to the inertia coordinate system. From the above expression, the right ascension $\theta$ and the declination $\phi$ of the star can be determined as follows:

$$\theta = \tan^{-1}\frac{y}{x}$$

$$\phi = \tan^{-1}\frac{z}{\sqrt{x^2+y^2}}$$

On the basis of the calculated $\theta$ and $\phi$, the corresponding star is searched. However, in consideration of the fact that the number of stars falling within the field of view of the star sensor is enormous, a star catalogue which is referred to in preparation of the star sub-catalogue used in the processing of mode I is prepared in the form of a table shown in FIG. 5A and stored in the memory. More specifically, in the star catalogue illustrated in FIG. 5A, the right ascension and the declination are, respectively, divided by 5° to define a corresponding number of blocks 50. Data of the right ascension, declination and brightness of all stars included in the blocks are, respectively, stored in the associated blocks in this order. Accordingly, on the basis of the calculated values of $\theta$ and $\phi$ and the field of view of the star sensor, those stars are extracted which satisfy the following conditions:

$$\theta - \Delta\theta < \tilde{\theta} < \theta + \Delta\theta$$

$$\phi - \Delta\phi < \tilde{\phi} < \phi + \Delta\phi$$

Figures 5A, 5B, 6:
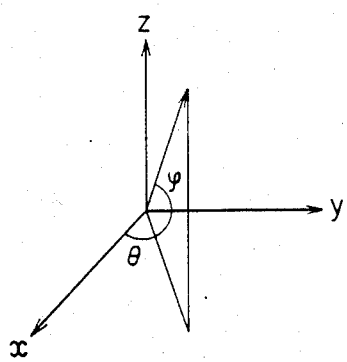
FIG. 5A shows a composition of a star catalogue used in the processing of mode II.
FIG. 5B is a view for illustrating right ascension and declination in a reference coordinate system.
FIG. 6 is a view showing a composition of a star sub-catalogue.

Thus, the search may be made only in the relevant block. It is then arithmetically determined at which positions on the sensor plate the stars as extracted make an appearance. By making use of the results of the calculation, values or coordinates of x and y on the sensor plate as well as the brightness h of the star are tabulated in the star sub-catalogue, as is shown in FIG. 6, to be subsequently transmitted to the satellite, which can then identify the corresponding star on the basis of data (FIG. 7) obtained through observation with the aid of the star sensor. The star identification may be realized through a known procedure. Now, the data of the star obtained through the observation and the corresponding data stored in the star catalogue are made use of to estimate the attitude angles representative of the attitude of the satellite. To this end, it is assumed that errors between the true attitude angles and the currently available attitude angle data are represented by $\Delta\theta(\Delta\theta_r, \Delta\theta_p, \Delta\theta_y)$ and that the position function of the i-th observed star on the sensor using the attitude angle is represented by $(f_i^x, f_i^y)$. More specifically, the observed data (x', y') is given by $$x' = f_i^x(\theta_r + \Delta\theta_r, \theta_p + \Delta\theta_p, \theta_y + \Delta\theta_y)$$

$$y' = f_i^y(\theta_r + \Delta\theta_r, \theta_p + \Delta\theta_p, \theta_y + \Delta\theta_y)$$

while the prediction data (x, y) contained in the star catalogue is given by $$x = f_i^x(\theta_r, \theta_p, \theta_y)$$

$$y = f_i^y(\theta_r, \theta_p, \theta_y)$$

On these conditions, following expressions apply to the i-th star.

$$\Delta x_i = x' - x = f_i^x(\theta_r + \Delta\theta_r, \theta_p + \Delta\theta_p, \theta_y + \Delta\theta_y) - f_i^x(\theta_r, \theta_p, \theta_y)$$

$$\Delta y_i = y' - y = f_i^y(\theta_r + \Delta\theta_r, \theta_p + \Delta\theta_p, \theta_y + \Delta\theta_y) - f_i^y(\theta_r, \theta_p, \theta_y)$$

The attitude errors $\Delta\theta_r$, $\Delta\theta_p$ and $\Delta\theta_y$ are calculated according to a non-linear test square method to thereby update the attitude angles $\theta_r$, $\theta_p$ and $\theta_y$ to $(\theta_r + \Delta\theta_r)$, $(\theta_p + \Delta\theta_p)$ and $(\theta_y + \Delta\theta_y)$, respectively. In the processings described above, the communication with the ground terminal is performed through the transmitter/receiver unit 13, while the processings for the attitude determination is performed by the processing unit 10. The calculated attitude angle is transmitted to a controller through a transmission path. The processings described above are repeated periodically at a predetermined interval.

The processing described so far is of the mode I and substantially corresponds to a hitherto known attitude determining method based on the star sub-catalogue or an extension thereof. With the present invention, it is contemplated to deal with the situation in which the star sub-catalogue can not be made use of. To this end, the invention teachs additionally the processings which will be mentioned below.

The mode decision unit selects the processing of mode II, when star identification based on the star position obtained through observation by the star sensor and the data of the star sub-catalogue has failed several times in succession or alternatively when the attitude angles of the satellite are to be altered to a significant degree in response to a command from the ground terminal.

Upon changing-over to the mode II, information indicating that the situation of satellite attitude determination is of the mode II and data resulting from observation of the stars are transmitted to the ground terminal from time to time. The data transferred to the ground terminal are sequentialized in a format illustrated in FIG. 7. On the basis of this data, it is arithmetically determined in which direction the star sensor is orientated in the reference coordinate system. The attitude data $(\theta_r, \theta_p, \theta_y)$ thus derived is transmitted to the satellite. In the system loaded on the satellite, the attitude data sent from the ground terminal is utilized, while other processings are not executed. For determining the satellite attitude data $(\theta_r, \theta_p, \theta_y)$, the processing unit installed in the ground terminal performs the attitude estimation processing by dividing the latter into two sub-processings, that is, (1) star identification processing and (2) attitude determining processing. In the first place, the processing for the star identification will be described. For the star identification, parameters characterized by disposition and brightness of a star are so selected as to coincide with the star data obtained through observation and the star data contained in the star catalogue. As the characteristic parameters for determining the coincidence, there are conceivable
(1) angular difference between two stars, and
(2) areal difference among three stars.

By way of example, the star identifying method in which the angular difference is employed as the characteristic parameters will be described. This method or procedure includes processing steps mentioned below.

Step 1: Stars as observed are arrayed in the order of brightness.

Step 2: With reference to the brightest star $(x_1^*, y_1^*, h_1^*)$, stars are represented by $(x_i^*, y_i^*, h_i^*)$ in the order of brightness, to thereby calculate sequentially vectors $X_i$ given by $$X_i = (d_i, h_i)$$

where $$d_i = \sqrt{(x_{i+1}^* - x_1^*)^2 + (y_{i+1}^* - y_1^*)^2}, \text{ and}$$

$$h_i = |h_{i+1}^* - h_1^*|$$

Step 3: In corresponding with the step 2, stars contained in the star catalogue are rearranged initially in the manner illustrated in FIG. 8 in the ground terminal system. Since $h_i^*$ is the intensity of the brightest star, the star among those listed in the rearranged star catalogue shown in FIG. 8 which is bright next to $h_1^*$ is selected as the subject for the star identification processing. In other words, the star of brightness h which satisfies the following condition is selected to be subjected to the star identification processing.

$$h_1^* - \Delta h < h < \Delta h + h_1^*$$

Step: The vectors $X_i$ derived from the data resulting from observation are represented by $X_i^p$, while $X_i$ determined on the basis of the star catalogue are represented by $X_i^c$.

The vector $X_i$ whose ordinal number i is smaller is assigned with a higher value of penalty for the noncoincidence and vice versa. More specifically, two-dimensional data $d = |d_i^p - d_i^c|$ and $h = |h_i^p - h_i^c|$ of the vectors $X_i^p = (d_i^p, h_i^p)$ and $X_i^c = (d_i^c, h_i^c)$ are imposed with the penalty in such a tabulated manner as illustrated in FIG. 9 where d and h are made discrete as $d_k$ and $h_l$ which are imposed with penalty $C_{k,l}^i$ of a corresponding weight. In FIG. 9, $C_{k,l}^i$ represents a penalty assigned to the vector $X_i$.

Step 5: When the sum of the penalties given to all the vectors $X_i$ (where $i = 1, 2, \ldots, N$) is smaller than a permissible value, i.e. when the condition $$\sum_{i=1}^{N} C_{k,l}^i < \epsilon$$

is met, the star identification is established. When a plurality of stars satisfy the above condition, the star of the least penalty is selected. Further, those stars which are found to meet the following conditions are then excluded from the identification processing.

$$\sum_{i=1}^{M} C_{k,l}^i > \epsilon, \text{ where } M < N$$

Step 6: By using the right ascension $\theta_n$ and the declination $\phi_n$ of the identified star, the processing for determining the attitude angles is performed.

The steps 1 to 6 constitute the star identifying procedure of mode II. On the basis of the right ascension and declination $(\theta_n, \phi_n)$ of the identified star, the attitude angle matrix $T_\theta^2$ which meets the following condition $$\begin{pmatrix} \cos\theta_n \cdot \cos\phi_n \\ \sin\theta_n \cdot \cos\phi_n \\ \sin\phi_n \end{pmatrix} = T_\theta^2 \cdot T_\theta' \cdot \vec{U'}$$

is determined to calculate the attitude angles $\theta(\theta_r, \theta_p, \theta_y)$. In the above expression, $\vec{U'}$ represents the direction vector of the identified star on the coordinate system mounting the sensor.

The processings described above are performed by the processing unit 7, wherein the attitude angle data as obtained is transmitted to the satellite. Thus, the processing of the mode II comes to an end.

As will now be appreciated from the foregoing description, the present invention makes it possible to determine the attitude of a satellite by making use of data obtained through a star sensor, even when the attitude angle data carried by the satellite can not be utilized.

What is claimed is:

1. A method of determining the attitude of an artificial satellite having a star sensor for observing positions of stars within a predetermined view-field, data processing means and communicating means for communicating with a ground station, comprising the following steps of:

carrying out a first operation mode including comparing observation data from the star sensor with star sub-catalogue data which is received from the ground station and which indicates a positional relation among stars in a certain partial area of the whole sky, and calculating attitude parameters of the satellite on the basis of the results of said comparing using said data processing means;

carrying out a second operation mode including transmitting the observation data from the star sensor to said ground station using said communication means, comparing in said ground station the observation data received from the satellite with star data indicating a positional relation among stars in the whole sky, calculating attitude parameters of the satellite from the results of said comparing and transmitting said calculated attitude parameters from said ground station to the satellite, so that the attitude parameters of the satellite calculated at the ground station are received by the satellite; and switching over the first operation mode to the second operation mode when the calculation of the attitude parameters of the satellite has failed in the first operation mode.

2. A method of determining attitude of an artificial satellite according to claim 1, wherein said first operation mode further includes a step of transmitting the attitude parameters to the ground station, calculating in the ground station the view-field of the star sensor on the basis of the attitude parameters, and then transmitting said star sub-catalogue of the certain partial area including said view-field to the satellite.

3. A method of determining attitude of an artificial satellite according to claim 2, wherein said star sub-catalogue is transmitted to the satellite from the ground station in the form of a star sensor coordinate system transformed from the positional relation of the stars.

4. A method of determining attitude of an artificial satellite according to claim 2, wherein the step of switching over from the first operation mode to the second operation mode is made when star identification between the observed stars by the star sensor and stars indicated in the star sub-catalogue has continuously failed a predetermined number of times.

5. A method of determining attitude of an artificial satellite according to claim 2, further comprising a step of changing over the first operation mode to the second operation mode in response to a command from the ground station.

6. A system for determining the attitude of satellite which communicates with a ground station, said satellite comprising:
 a star sensor for observing star positions within a view-field of the star sensor;
 first memory means for storing star sub-catalogue data of positions of stars in a certain partial area of the whole sky including the view-field of the star sensor;
 first data processing means for calculating attitude parameters of the satellite by comparing the observation data of the star sensor with the star sub-catalogue data stored in the first memory means;
 means for choosing either one of first and second operation modes for determining the attitude of the satellite, comprising means for choosing the first operation mode when stability of the attitude of the satellite satisfies a predetermined condition, or otherwise for choosing the second operation mode when the stability does not satisfy said predetermined condition; and
 first communication means for transmitting the attitude parameters calculated by said first data processing means when said choosing means chooses the first operation mode, and for transmitting the data of observation of the stars by the star sensor when the choosing means chooses the second operation mode;
 said ground station comprising:
 second communication means for communicating with the satellite;
 second memory means for storing star catalogue data of positions of stars in the whole sky; and
 second data processing means responsive to receipt of the attitude parameters from the satellite for producing the star sub-catalogue data for the certain partial area of the whole sky including the view-field by calculating the view-field of the star sensor on the basis of the attitude parameters, said star sub-catalogue data being transmitted to the satellite through said second communication means, and responsive to receipt of the data of the star observation of the star sensor from the satellite for calculating the attitude parameters of the satellite by comparing the star observation data with the star catalogue data stored in the second memory means and for transmitting said calculated attitude parameters to the satellite through said second communication means.

7. A system for determining the attitude of a satellite according to claim 6, wherein said choosing means operates to change from the first operation mode to the second operation mode when the first data processing means has failed to detect comparison of the data of star observation with the star sub-catalogue.

8. A system for determining the attitude of a satellite according to claim 7, wherein said choosing means includes means for counting continued failure to detect said comparison and for changing the first operation mode to the second operation mode when the number of such failures reaches a predetermined number.

9. A system for determining the attitude of a satellite according to claim 6, wherein said choosing means operates to choose either one of said two modes in response to a command from the ground station.

* * * * *